United States Patent [19]

Langner

[11] Patent Number: 4,549,648
[45] Date of Patent: Oct. 29, 1985

[54] BUCKET-WHEEL LOADER FOR BULK MATERIAL PILES

[75] Inventor: Alexander Langner, Duisburg, Fed. Rep. of Germany

[73] Assignee: Fried. Krupp Gesellschaft mit beschränkter Haftung, Essen, Fed. Rep. of Germany

[21] Appl. No.: 467,359

[22] Filed: Feb. 15, 1983

[30] Foreign Application Priority Data

Mar. 4, 1982 [DE] Fed. Rep. of Germany ....... 3207751

[51] Int. Cl.⁴ .............................................. B65G 65/02
[52] U.S. Cl. .................................. 198/509; 198/601; 37/189; 37/91
[58] Field of Search ............... 198/307, 509, 512, 518, 198/519, 601; 414/133; 37/189, 190, 191 A, 191 R, 192 A, 192 R, 70, 91, 94, 95, 96

[56] References Cited

U.S. PATENT DOCUMENTS

| 3,121,488 | 2/1964 | Chittock | 198/518 X |
| 3,298,494 | 1/1967 | Pfeilschifter | 198/307 |
| 3,306,476 | 2/1967 | McMillan | 198/509 X |
| 3,687,265 | 8/1972 | Heitzer | 198/518 X |
| 3,891,079 | 6/1975 | Roper | 414/133 X |
| 4,013,180 | 3/1977 | Pionter et al. | 198/518 X |
| 4,037,735 | 7/1977 | Althoff | 198/518 X |

FOREIGN PATENT DOCUMENTS

| 755273 | 8/1951 | Fed. Rep. of Germany | 37/190 |
| 143067 | 7/1980 | Fed. Rep. of Germany | 198/518 |

Primary Examiner—Joseph E. Valenza
Assistant Examiner—Jonathan D. Holmes
Attorney, Agent, or Firm—Becker & Becker, Inc.

[57] ABSTRACT

A bucket wheel loader, especially a bridging equipment or loader, for bulk material dumps or piles. The loader is equipped with several bucket wheels which are movable along the front of a pile. The axes of rotation of the bucket wheels are arranged so as to have planes of rotation of the bucket wheels extend approximately transverse relative to the front of a pile of bulk material; the axes of rotation are disposed one above the other in a permanent correlation. The upper bucket wheel or wheels are expediently associated with a boom which is adjustable in relation to the front of a pile.

2 Claims, 2 Drawing Figures

BUCKET-WHEEL LOADER FOR BULK MATERIAL PILES

BACKGROUND OF THE INVENTION

1. Field of the Invention

The present invention relates to a loader, especially a bridging loader, equipped with at least two bucket wheels for loose or bulk material dumps or piles, with the bucket wheels being movable along the front of a pile of bulk material.

2. Description of the Prior Art

With known loaders of the aforementioned general type, the bucket wheels are arranged next to one another. The use of several bucket wheels generally increases the conveying capacity, but especially serves to improve the thorough intermixing or blending of different constituents of the deposited or dumped bulk material. The bucket wheels are moved back and forth at the base of the front of a pile. The bulk material which is to be removed or conveyed away is essentially supplied to the bucket wheels via different feeding devices, such as rakes, scrapers, chains, cutters, or other loosening devices. These devices, which perform conveying or vibrating motions, often require a considerable cost for apparatus. Additionally, the danger exists in many cases during use of these devices that the pile becomes undercut, as a result of which the bucket wheels are covered up. Feeding or supplying these devices is especially difficult where the pieces of bulk or loose material are coarser, for example about 300 mm; these difficulties increase considerably with larger advance steps of the loader, i.e. such greater than 300 mm.

It is therefore an object of the present invention to provide a bucket wheel loader with which especially even coarser bulk material can be reliably removed or conveyed away from the pile without difficulties.

BRIEF DESCRIPTION OF THE DRAWINGS

This object, and other objects and advantages of the present invention, will appear more clearly from the following specification in connection with the accompanying drawings, in which.

SUMMARY OF THE INVENTION

Figure 1:
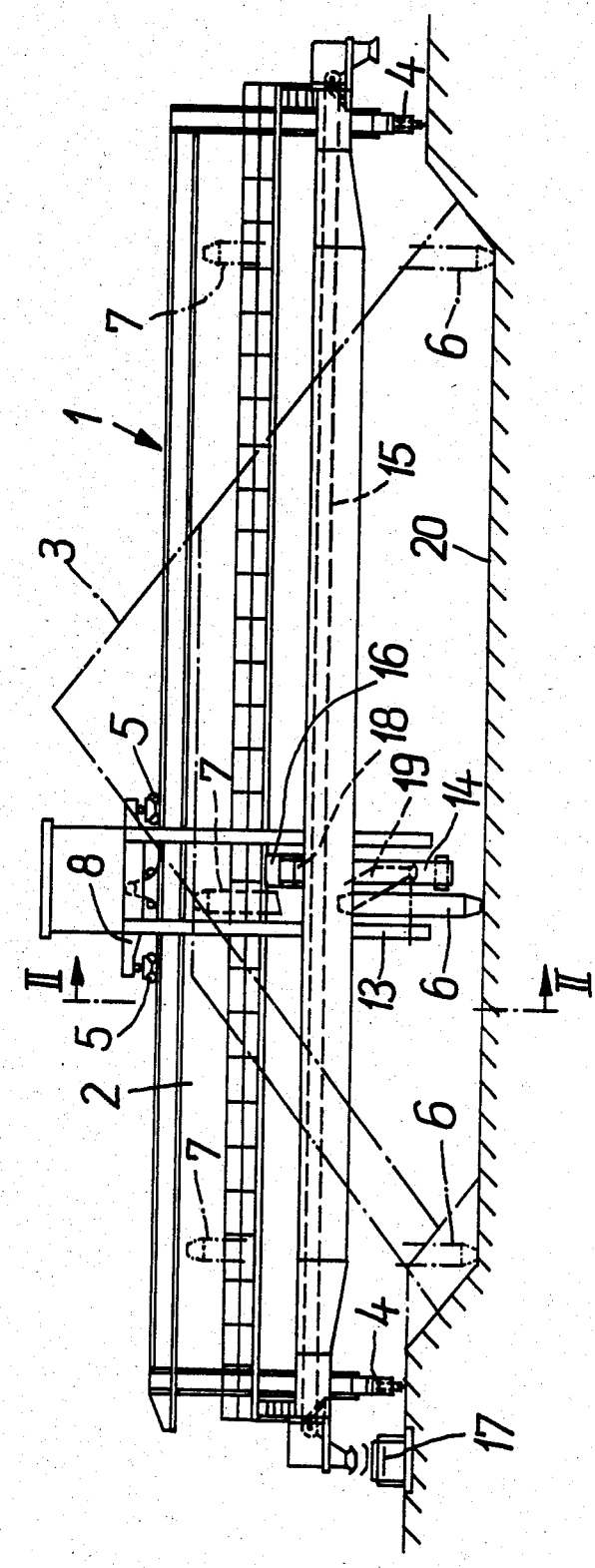
FIG. 1 diagrammatically illustrates the front of a loose or bulk material pile with one embodiment of an inventive bridging loader located before it.

The loader of the present invention is characterized primarily in that essentially the axes of rotation of at least two bucket wheels are disposed one above the other in a permanent correlation so as to have planes of rotation of the bucket wheels relative to a pile of bulk material; these planes of rotation extends at least approximately transverse to the front of a pile or dump of bulk material.

The present invention provides the advantage that the expensive feeding devices necessary especially for high piles are eliminated, and that a good, thorough intermixing or blending of the bulk material is nevertheless obtained.

Pursuant to a further advantageous construction according to the present invention, at least the upper bucket wheel or wheels may be associated with the loader via a respective boom, the length of which can be varied. Respective conveyor belts associated with the booms may, via a chute, drop bulk material, which the upper bucket wheel or wheels have removed from the pile, onto the conveyor belt of the boom located therebelow.

A bucket wheel excavator equipped with several bucket wheels which operate at different heights is known (German patent application 84d 1/03 L8905, published on Nov. 22, 1951). However, the bucket wheels of this device, which is not intended or designed for loading bulk material, are not arranged one above the other, but rather next to one another. This heretofore known device is not intended nor suitable for loading high piled-up bulk material.

DESCRIPTION OF A PREFERRED EMBODIMENT

Referring now to the drawings in detail, the bridging loader or equipment 1 has a box-like longitudinal member 2 which is provided with a rail travel mechanism 4 on both or opposite sides of the dump or pile 3. A carriage 8 carrying two bucket wheels 6 and 7 is longitudinally movable on the longitudinal member 2 via travel mechanisms or bogies 5.

Figure 2:
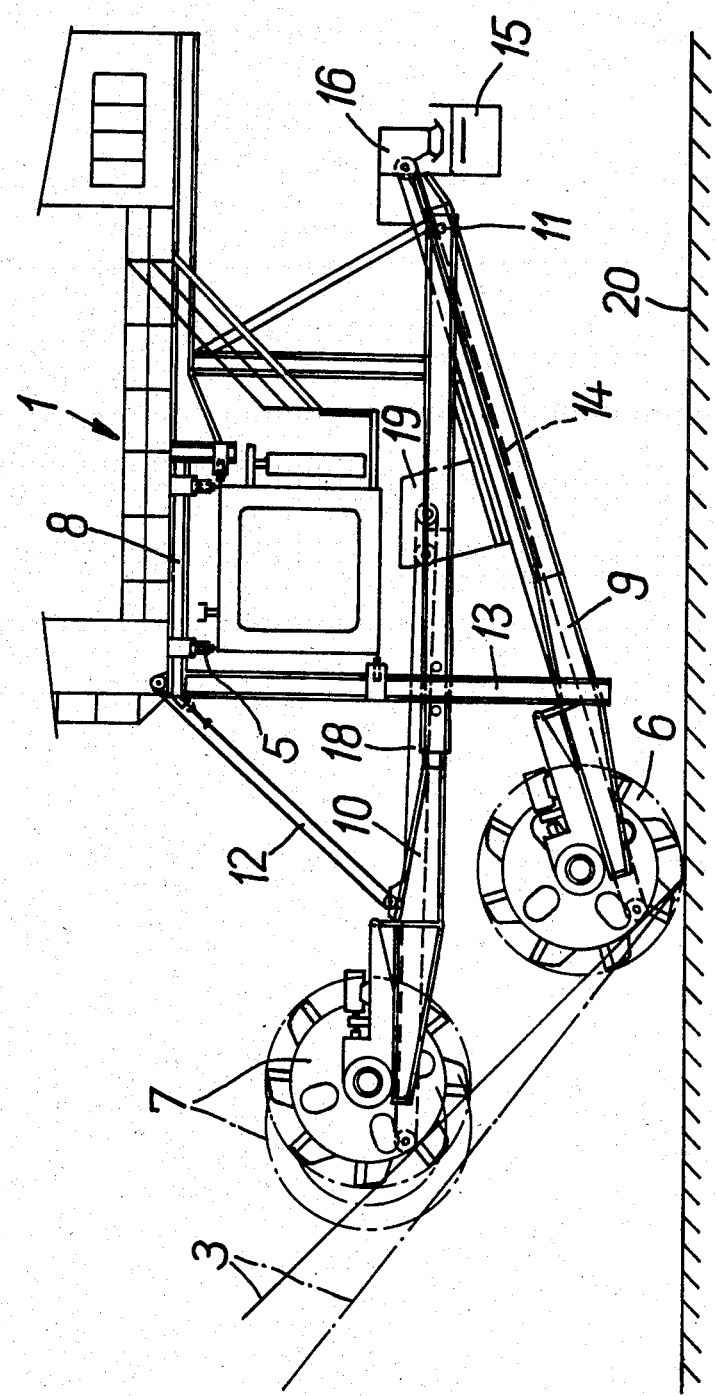
FIG. 2 is a section taken along line II—II in FIG. 1.

Each of the bucket wheels 6 and 7 is mounted at the end of a boom 9 or 10, as shown in FIG. 2. The booms 9 and 10 extend below and beyond the longitudinal member 2, and are connected to a strut or support of that side of the carriage 8 remote from the pile 3 by means of a common horizontal axle or shaft 11 about which the booms 9 and 10 can respectively be slightly pivoted. The upper boom 10, which carries the bucket wheel 7, is constructed telescopically so that its length can be varied. As shown in FIG. 2, the upper boom 10 is supported at its extendible end by a hoist or winch 12 which is connected to the carriage 8 and makes it possible to adjust the height and length of the boom 10 relative to the pile 3. The boom 9, which carries the lower bucket wheel 6, is held on a vertical strut or support 13 of the carriage 8. The boom 9 is provided with a conveyor belt 14 which has a chute 16 at the discharge end for delivery onto a conveyor belt 15. The reversible conveyor belt 15 extends parallel to the longitudinal member 2, and supplies a belt conveyor 17 which extends alongside the pile 3 (FIG. 1).

The boom 10 is provided with a conveyor belt 18 by means of which the loose or bulk material dropped or dumped from the bucket wheel 7 is discharged via a chute 19 onto the conveyor belt 14, upon which the dumped material, together with the material supplied by the bucket wheel 6, passes via the conveyor belt 15 onto the belt conveyor 17, which conveys the material away. In order to compensate for the shifting of the discharge end of the conveyor belt 18 caused by the longitudinal adjustment of the boom 10, the chute 19 is either likewise longitudinally adjustable, or is made appropriately longer.

The bucket wheels operate conventionally in narrow pitch cut, with the lower bucket wheel 6 being placed in the vicinity of the base 20 of the pile 3, and the upper bucket wheel 7 being placed and adjusted at an appropriate distance above the bucket wheel 6 as required by the actual conditions. The upper bucket wheel 7 for this purpose also can be adjusted during operation. A position of the bucket wheel 7 adapted to a flatter pile front is indicated by dot-dash lines in FIG. 2.

The novel bridging equipment or loader can be pivotable about a vertical axis at one end for use on a rounded pile. Additionally, several carriages provided with bucket wheels arranged one above the other can be utilized. The number of bucket wheels arranged one above the other is generally two, although the number is determined according to the requirements of the specific situation involved.

The present invention is not restricted to bridging equipment or loaders, but rather covers all suitable known devices which can be provided with the various known travel mechanisms or other conveying devices.

Furthermore, the present invention is, of course, in no way restricted to the specific disclosure of the specification and drawings, but also encompasses any modifications within the scope of the appended claims.

What I claim is:

1. A bridging loader being intended for use on piles of bulk material, with bucket wheels being movable along the front of such a pile of bulk material; the improvement comprising at least two bucket wheels each mounted on a boom, with the axes of rotation of said bucket wheels being disposed one above the other, the first and second bucket wheels being rotatable in a common plane of rotation extending at least approximately transverse to said front of said pile said booms of said first and second bucket wheels being mounted by means of a common horizontal shaft means to permit said booms to be pivoted slightly relative to each other, said boom associated with the upper bucket wheel being a variable-length boom constructed telescopically to make possible adjustment in height and length of said boom relative to the pile of bulk material and the lower bucket wheel, and means for conveying material from said first and second bucket wheels to be combined for discharge together therefrom.

2. A loader according to claim 1, in which said last means includes each boom of each upper bucket wheel having associated therewith a first conveyor belt means; each further boom of each lower bucket wheel having operatively associated therewith a further conveyor belt means; and said loader including a chute operatively associated with each boom of each upper bucket wheel by means of which bulk material picked up from said pile by an upper bucket wheel and deposited on the first conveyor belt means operatively associated therewith is transferred to the further conveyor belt means of the further boom located therebelow such that bulk material is brought together from two conveyor belt means.

* * * * *